United States Patent [19]

Teller et al.

[11] Patent Number: 4,668,653
[45] Date of Patent: May 26, 1987

[54] METHOD FOR THE INCORPORATION OF METALS INTO HIGH TEMPERATURE ANTIMONY OXIDE

[75] Inventors: Raymond G. Teller, Aurora; James F. Brazdil, Mayfield Village, both of Ohio

[73] Assignee: The Standard Oil Company, Cleveland, Ohio

[21] Appl. No.: 769,559

[22] Filed: Aug. 26, 1985

[51] Int. Cl.$^4$ .................. B01J 23/18; B01J 23/20; B01J 23/22; B01J 23/28
[52] U.S. Cl. .................... 502/215; 502/311; 502/312
[58] Field of Search .................. 502/215, 311, 312

[56] References Cited

U.S. PATENT DOCUMENTS

| | | | |
|---|---|---|---|
| 3,094,565 | 6/1963 | Bethell et al. | 502/215 X |
| 3,904,653 | 9/1975 | Milberger et al. | 260/346.8 |
| 3,907,834 | 9/1975 | Milberger et al. | 502/311 X |
| 3,928,240 | 12/1975 | Milberger et al. | 252/467 |
| 3,984,353 | 10/1976 | Sergunkin et al. | 502/311 X |
| 4,021,427 | 5/1977 | Dolhyj et al. | 260/346.8 |
| 4,065,468 | 12/1977 | Grasselli et al. | 260/346.75 |
| 4,240,931 | 12/1980 | Milberger et al. | 252/438 |

OTHER PUBLICATIONS

F. J. Berry and M. E. Brett "Investigations of Solid State Properties of Vanadium–Antimony Oxide Catalysts" *J. of Catalysis*, 88, 232–236 (1984).
D. Rogers and A. C. Skapski "The Crystal Structure of Beta-Sb$_2$O$_4$: A New Polymorph" *Proc. Chem. Soc.*, 400 (1964).

*Primary Examiner*—W. J. Shine
*Attorney, Agent, or Firm*—Joseph G. Curatolo; Larry W. Evans

[57] ABSTRACT

A method for incorporation of metals into antimony oxide to form a compound having the formula

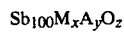

$$Sb_{100}M_xA_yO_z$$

where
M is Mo, Te or both,
A is V, Nb, Ta, W, Bi and mixtures thereof,
x is 0.1 to 5, y is 0 to 10 and z is a number sufficient to satisfy the valence of the other elements.

The method compriss mixing an antimony compound with an oxide or salt of at least one metal selected from the group consisting of M and A and heating the mixture to a temperature of up to about 850° C. to produce the compound, the Sb$_2$O$_4$ component of which is substantially present in the beta form. These steps are also employed in a method for converting low temperature antimony oxide into high temperature antimony oxide. High temperature antimony oxides containing Mo or Te are novel.

20 Claims, No Drawings

METHOD FOR THE INCORPORATION OF METALS INTO HIGH TEMPERATURE ANTIMONY OXIDE

TECHNICAL FIELD

The present invention relates to the synthesis of high temperature antimony oxide, beta-$Sb_2O_4$ from low temperature antimony oxide alpha-$Sb_2O_4$. This synthesis is performed at a lower temperature than is customary for the conversion of the alpha form to the beta and involves the incorporation of molybdenum or tellurium into the matrix. Antimony oxides containing molybdenum or tellurium are also novel. These compounds have varied utilities including, for instance, use as pigments and as catalysts.

BACKGROUND ART

It is known from the literature that alpha-antimony oxide can be converted to beta-antimony oxide by heating the former to about 1130° C. in dry oxygen. See for instance, "The Crystal Structure of Beta-$Sb_2O_4$: A New Polymorph", *Proc. Chem. Soc.*, 400 (1964).

Catalysts comprising antimony and molybdenum and their use in oxidation reactions are well known from the following patents owned by the Assignee of record herein. U.S. Pat. No. 3,904,653, for instance, is directed toward the synthesis of maleic anhydride over a catalyst containing antimony and molybdenum, promoted by iron, vanadium or both.

U.S. Pat. No. 3,928,240 is directed toward a process of preparing catalysts containing molybdenum and oxygen with antimony, vanadium or tungsten. The process calls for partially reducing an aqueous solution or slurry of hexavalent molybdenum to a valence state below +6.

U.S. Pat. No. 4,021,427 is directed toward the oxidation of 1,3-butadiene to maleic anhydride with a catalyst containing molybdenum, antimony and vanadium with lithium or cerium or both and an optional reducing agent.

U.S. Pat. No. 4,065,468 discloses a process for the preparation of maleic anhydride from n-butane in the presence of a catalyst containing oxides of antimony, molybdenum and at least iron or vanadium with one or more optional promoter elements.

U.S. Pat. No. 4,240,931 is also directed toward the synthesis of maleic anhydride in the presence of an antimony/molybdenum oxide catalyst which contains at least one of niobium, zirconium, titanium and tantalum and an optional reducing agent.

As can be reasonably deduced from a review of the foregoing patents, antimony and molybdenum oxide containing catalysts can be promoted with a variety of elements and favorably used for the synthesis of maleic anhydride from a variety of compounds. Nevertheless, none of these patents discloses beta-antimony oxides, which can be prepared via a method of the present invention. Thus, the foregoing patents are only representative of the state of the art in antimony/molybdenum oxide catalysts.

It is also known that vanadium can be incorporated into antimony oxide at temperatures exceeding 800° C. to form beta-$Sb_2O_4$. These findings were reported in an article entitled "Investigations of Solid State Properties of Vanadium-Antimony Oxide Catalysts" *J. of Catalysis* 88, 236–236 (1984). Nevertheless, this work fails to teach that molybdenum could be substituted for vanadium.

SUMMARY OF THE INVENTION

The present invention provides a method for the incorporation of metals into high temperature form antimony oxide. The result is a compound having the general formula

$$Sb_{100}M_xA_yO_z$$

where
M is Mo, Te or both,
A is V, Nb, Ta, W, Bi and mixtures thereof,
x is 0.1 to 5,
y is 0 to 10, and
z is a number sufficient to satisfy the valence of the other elements.

The method includes the steps of mixing an antimony compound with an oxide or salt of at least one metal selected from the group consisting of M and A and heating the mixture to a temperature of up to about 850° C. to produce the foregoing compound, the $Sb_2O_4$ component of which is substantially present in the beta form.

A second method of the present invention provides for the conversion of low temperature antimony oxide to the high temperature form and comprises the steps of mixing an antimony compound with an oxide or salt of at least one metal selected from the group consisting of Mo and Te and heating the mixture to a temperature of up to about 850° C. to produce a compound comprising beta-$Sb_2O_4$ with at least one of Mo and Te incorporated therein.

As a result of either of the foregoing methods a plurality of novel compounds are obtained having either of the general formulae $$Sb_{100}M_xO_z$$

$$Sb_{100}M_xA_yO_z$$

where M, x, y and z are as described hereinabove and comprising beta-$Sb_2O_4$.

PREFERRED EMBODIMENT FOR CARRYING OUT THE INVENTION

As is known, the beta form of antimony oxide has a greater symmetry than the alpha form and is therefore more stable. As was stated in the Background, the transition of the alpha form to the beta via heating has been known to occur at high temperatures, e.g., about 1130° C., since 1964. Although subsequently, this temperature has been reduced to about 935° C., the present invention allows the conversion to be made at 850° C. and, at the same time, allows for the introduction of one or more metals.

The resulting composition contains predominantly the beta form of antimony oxide, and has the following formula

$$Sb_{100}M_xO_z$$

where
M is Mo, Te and mixtures thereof
x is 0.1 to 5 and z is a number necessary to satisfy the valence of the other elements.

Thus, the antimony oxide compound can comprise $Sb_{100}Mo_xO_z$, $Sb_{100}Te_xO_z$ or $Sb_{100}Mo_xTe_xO_z$. It is also possible to incorporate one or more of the A elements, V, Nb, Ta, W and Bi noted hereinabove to form such compounds as $Sb_{100}Mo_xV_yO_z$; $Sb_{100}Te_xV_yO_z$; $Sb_{100}Mo_xNb_yO_z$; $Sb_{100}Mo_xTa_yO_z$; $Sb_{100}Mo_xW_yO_z$; $Sb_{100}Te_xBi_yO_z$ and the like where y is >0 to 10.

As noted hereinabove, the present invention provides a method for the incorporation of metals into high temperature or beta form $Sb_2O_4$. The invention also provides a new method for preparing high temperature stabilized $Sb_2O_4$ from the lower temperature, alpha form. The transformation of the alpha to the beta is promoted by addition of Mo or Te and optionally, several other metals including V, Nb, Ta, W and Bi. The activity of beta $Sb_2O_4$ as a catalyst is markedly different than that of the alpha $Sb_2O_4$ form and additional differences may be manifested with the presence of various metals incorporated in the compound.

Preparation of the compound for the practice of either method involves the same steps, mixing the components together followed by a stage of heating. The step of mixing can be performed by forming a solution or slurry or by grinding according to the present invention. More particularly, the metal incorporation can be accomplished by first forming an aqueous solution or slurry of any low temperature form of antimony oxide in water or antimony chloride in water. Next, an oxide or salt of Mo or Te is added and optionally, one or more of V, Nb, Ta, W or Bi is added.

The resulting mixture is then subjected to the heating step which can be initiated by stirring and heating to dryness. Once dry, heating is continued to about 850° C. and maintained there for at least one-half hour and preferably three or more hours. Heating may be conducted readily in open air although heating in oxygen may be employed. At the completion of heating, the beta form of $Sb_2O_4$ is substantially obtained having incorporated therein one or more of the M metals, and an A metal if an A metal oxide or salt were employed, e.g., $V_2O_5$, ammonium vanadate and the like.

As an alternative mixing step, the powders of the antimony salt, antimony oxide or other, and M and optional A metal salts are ground together to form the mixture. For the heating step, this mixture is then placed in a suitable vessel, such as a quartz tube, and heated to a temperature of up to about 850° C. for about one-half to 18 hours with three hours being preferred. After heating, the beta form of $Sb_2O_4$ is obtained having incorporated therein one or more of the M metals and an A metal if an A metal oxide or salt were employed. This particular step can also be conducted by grinding in the vessel that is subsequently heated and in either situation, the vessel can also be sealed and evacuated, if desired, prior to hearing.

An alternative heating step involves spray drying of a soluble or slurried salt or oxide mixture or gel of the antimony, M and optional A metals into a heated environment, oven, furnace or the like at a temperature of between about 100° to about 850° C. At the lower temperature, a subsequent heating of the dry mixture would be conducted while at a temperature of about 800° C., the secondary heating would likely be unnecessary. Of course, at the intermediate ranges, various heating periods could be employed.

Regarding the salts, the present invention is not necessarily limited to a particular anion, suitable species including sulfates, nitrates, carbonates, chlorides and the like. Metallic anions such as molybdates, tellurates, vanadates and the like can also be employed with an ammonium ion, for instance. Suitable M and A salts include for instance molybdenum and tellurium sulfate, nitrate, carbonate and chloride as well as vanadium, niobium, tantalum, tungsten and bismuth nitrate, sulfate, carbonate and chloride. Oxides of these metals such as $MoO_3$, $V_2O_5$ and the like could also be employed. In either method, a stoichiometric amount or greater of the metal oxide or metal salt can be employed; any excess thereof can be removed by extraction.

Crucial to both methods is the incorporation of Mo or Te or both into the $Sb_2O_4$ compound. The amount of Mo employed can be widely varied between as little as 0.1 mole percent to as high as 10 to 20 mole percent. For Te, greater amounts are necessary, preferably at the 10 to 30 mole percent level. Product characterizations have revealed that a higher amount of the antimony oxide is transformed from the alpha to the beta form when Mo is incorporated than when Te is, irrespective of the relative amounts of each employed. Regarding the optional metals, V, Nb, Ta, W and Bi, these can be employed in amounts ranging between 0 and ·10 mole percent.

In the exemplification provided hereinbelow incorporation of molybdenum is first presented via slurrying and via grinding in order to demonstrate practice of the present invention. Subsequent examples provide for the incorporation of molybdenum and vanadium together and of tellurium alone.

EXAMPLE NO. 1

In a suitable vessel 26.24 gms of antimony oxide ($Sb_2O_3$) was combined with 100 ml of water to form a slurry. To this was added 7.06 gms of ammonium heptamolybdate dissolved in 100 ml of water. The resulting mixture was vigorously stirred and heated at about 120° C., first until dry and then in an oven in open air. The heating cycle in the oven was 290° C., 425° C. and 850° C. for 3, 3 and 4 hours, respectively. The product resulting was beta-$Sb_2O_4$ containing Mo.

EXAMPLE NO. 2

10.76 gms of alpha-$Sb_2O_4$ and 2.16 gms of $MoO_3$ powders were ground in a mortar and then placed in a quartz tube which was evacuated to about $10^{-2}$ mm Hg. The tube was then placed in an oven at 850° C. for 48 hours and produced beta-$Sb_2O_4$ containing Mo as the product.

Products of Examples No. 1 and 2 were subjected to analyses to confirm their composition as follows: First, elemental analysis showed the presence of molybdenum. Next, X-ray diffraction, neutron diffraction and Raman Spectroscopy were employed and indicated only the beta form of $Sb_2O_4$. From this it was concluded that Mo must be incorporated into the beta-$Sb_2O_4$ matrix. Electron microscopy indicated that only one phase was present. One last observation was that the new compound was a light orange color whereas pure beta-$Sb_2O_4$ is a light yellow (almost white) color.

EXAMPLE NO. 3

0.18 gms of ammonium molybdate and 0.47 gms of ammonium vanadate were dissolved in 200 ml of water. To this was added 14.57 gms of antimony oxide (Sb₂O₃). This slurry was vigorously stirred and heated at reflux for 16 hours, then dried at 120° C. overnight, placed in an oven and heated at 295° C., 425° C. and 850° C. for 8, 2 and 3½ hours, respectively. The product consisted of beta-$Sb_2O_4$ containing Mo and V.

EXAMPLE NO. 4

To 188.71 gms of "antimony sol" (a 12% by weight colloid of $Sb_2O_5$ in water) was added 9.58 gms of tellurium oxide ($TeO_2$). This slurry was vigorously stirred and heated at 120° C. until dry. Then placed in an oven and heated at 120° C. and 295° C. for 3 and 18 hours, respectively. The sample was allowed to cool to room temperature and was then ground with a motor and pestle. This product was heated at 850° C. for four hours. The resulting product consisted of a mixture of alpha and beta $Sb_2O_4$ containing Te.

As a result of the successful incorporation of Mo, both Mo and V, and Te into antimony oxide and the conversion of the latter into the beta-form it is believed that the compounds $Sb_{100}Mo_xO_z$, $Sb_{100}Mo_xV_yO_z$ and $Sb_{100}Te_xO_z$ are novel as are the compounds depicted more broadly by the formulae

$Sb_{100}M_xO_z$ and

$Sb_{100}M_xA_yO_z$ where M, A, x, y and z are as described hereinabove. It is to be understood that only those compounds having incorporated one or more of the foregoing M metals into the beta form are deemed to be novel over existing compounds comprising, for instance, molybdenum oxides with alpha $Sb_2O_4$.

Inasmuch as $Sb_2O_4$ is generally known to possess surface acid sites, the compounds of the present invention are expected to be acid catalysts. Specifically if a gaseous mixture of $CH_3CN/H_2O/O_2$/diluent gas were passed over a solid Mo-stabilized-beta-$Sb_2O_4$ catalyst, significant amounts of the hydrolysis products of acetonitrile ($CH_3CN$) could be expected such as acetamide ($CH_3C(O)NH_2$) and/or acetic acid ($CH_3COOH$).

Moreover, because the material is colored differently from pure beta-$Sb_2O_4$, Mo incorporation into beta-$Sb_2O_4$ is useful to provide a pigment for paint. The color of beta-$Sb_2O_4$ with Mo incorporation is tan-orange. Because this color is due to Mo incorporation into the solid, and the color of Mo compounds can vary depending upon the Mo oxidation state, it is believed to be possible to alter the color of the material by altering the oxidation state of the Mo during synthesis. One manner by which this could be accomplished would be by controlling the $O_2$ partial pressure at elevated temperatures.

The incorporation of molybdenum, or for that matter tellurium, into antimony oxides has been found in our investigations to differ from vanadium incorporation which is known and has been referenced in the Background hereinabove. Vanadium incorporation or doping of antimony has been studied fairly comprehensively. The structure of vanadium doped antimony oxide has been determined by powder neutron and X-ray diffraction.

The structure consists of two types of antimony atoms, $Sb^{5+}$ in octahedral oxygen environments (labeled $Sb^O$) and $Sb^{3+}$ ions in very distorted form coordinate oxygen environments (labeled $Sb^T$) and vanadium incorporation causes little alteration in this structure. Refinements of the atomic occupancies indicate that the formula of the V-doped system is $Sb_{1.0}{}^OSb_{0.95}{}^TO_{3.81}$.

Analyses indicate that the host structure, beta-$Sb_2O_4$ is, on the average, undisturbed. That is, Sb-O bond distances and angles for the V doped structure are identical to those of pure beta-$Sb_2O_4$. Inasmuch as $Sb^{5+}$ and $V^{5+}$ are similar in size, it is reasonable to expect that vanadium atoms simply substitute for $Sb^{5+}$ (octahedral) ions. However, the five percent vacancy of the Sb(T) sites indicates that the five percent V dopant may be located at this point in the structure. Additionally, the differences that were observed between this material and that of the pure beta-$Sb_2O_4$ were in the Sb(T) oxygen environment. The resulting model was 100% metal occupancy, and oxygen deficiency (95% occupied).

Molybdenum also forms a solid solution (1½% solubility) with beta-$Sb_2O_4$. Molybdenum-edged EXAFS data were collected for the Mo-doped $Sb_2O_4$ sample in order to determine the structure in the immediate vicinity of the Mo atoms. The mode of incorporation of molybdenum was found to be radically different from that of vanadium dissolution. As revealed from powder neutron diffraction structure analysis and EXAFS measurements, molybdenum is situated adjacent to two Sb(T) sites, with subsequent vacancy of both Sb(T) sites, 3 percent. Based on refinements of the neutron data, there is no apparent oxygen vacanacy, hence the oxidation state of the molybdenum is +6. The advantage of EXAFS, or extended X-ray absorption fine structure, spectroscopy over neutron diffraction methods is that EXAFS is an element-specific technique that is capable of probing the local structure around an X-ray absorbing atom, regardless of the physical state of the sample.

In conclusion, it is to be understood that the examples have been provided to enable those skilled in the art to have representative examples by which to evaluate the invention and that these examples should not be construed as any limitation on the scope of this invention. Inasmuch as the composition of the beta-antimony oxide containing compounds of the present invention can be varied within the scope of the total specification disclosure, neither the particular M or A metals nor the relative amounts thereof shall be construed as limitations of the invention.

Furthermore, practice of the present invention should not be limited to a specific oxide or salt of antimony or M group metal or optional A ground metal, so long as the materials can be mixed together thoroughly and uniformly as, for instance, by slurrying or grinding. These specific means are not meant to exclude other forms of mixing that prove to be expedient. As will be appreciated, heating conditions such as would encompass pressure and type of atmosphere, e.g., air or oxygen, can also be modified without falling outside of the present invention.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

We claim:

1. A method for incorporation of metals into antimony oxide to form a compound having the formula $$Sb_{100}M_xA_yO_z$$

where

M is Mo, Te or both;

A is V, Nb, Ta, W, Bi and mixtures thereof;

x is 0.1 to 5; y is 0 to 10 and z is a number sufficient to satisfy the valence of the other elements;

comprising the steps of:

mixing an antimony compound with an oxide or salt of at least one metal selected from the group consisting of M and A; and heating said mixture to a temperature of up to about 850° C. to produce said compound, the $Sb_2O_4$ component of which is substantially present in the beta form.

2. A method, as set forth in claim 1, wherein said step of mixing comprises:

combining said antimony compound and an oxide or a salt of at least one said group M metal to form a mixture.

3. A method, as set forth in claim 2, wherein said step of heating comprises:

stirring and heating said mixture to dryness prior to raising the temperature up to about 850° C.

4. A method, as set forth in claim 2, wherein said step of heating comprises:

spray drying said mixture into a heated environment at a temperature of from about 100° C. to about 850° C.

5. A method, as set forth in claim 2, wherein said step of mixing includes the further step of adding an oxide or salt of at least one said group A metal to said mixture.

6. A method, as set forth in claim 1, wherein said step of mixing comprises:

grinding said antimony compound and an oxide or salt of at least one said group M metal together.

7. A method, as set forth in claim 6, wherein said step of heating comprises:

heating said ground mixture in a suitable vessel.

8. A method, as set forth in claim 6, wherein said step of grinding includes the further step of adding an oxide or salt of at least one said group A metal to said ground mixture.

9. A method, as set forth in claim 1, wherein said antimony compound is selected from the group consisting of alpha-antimony oxide and antimony chloride.

10. A method, as set forth in claim 1, wherein said step of heating is conducted for a period ranging from at least about one-half to about 18 hours.

11. A method for the conversion of the alpha form of antimony oxide to the beta form comprising the steps of:

mixing an antimony compound with an oxide or salt of at least one metal selected from the group consisting of Mo and Te; and heating said mixture to a temperature of up to about 850° C. to produce a compound comprising beta-$Sb_2O_4$ with at least one of Mo and Te incorporated therein.

12. A method, as set forth in claim 11, wherein said step of mixing comprises:

combining said antimony compound and an oxide or salt of at least one said group M metal to form a mixture.

13. A method, as set forth in claim 12, wherein said step of heating comprises:

stirring and heating said mixture to dryness prior to raising the temperature up to about 850° C.

14. A method, as set forth in claim 12, wherein said step of heating comprises:

spray drying said mixture into a heat environment at a temperature of from about 100° C. to about 850° C.

15. A method, as set forth in claim 12, wherein said step of mixing includes the further step of adding an oxide or a salt of at least one metal selected from the group consisting of V, Nb, Ta, W and Bi to said mixture.

16. A method, as set forth in claim 11, wherein said step of mixing comprises:

grinding said antimony compound and an oxide or salt of at least one said group M metal together.

17. A method, as set forth in claim 16, wherein said step of heating comprises:

heating said ground mixture in a suitable vessel.

18. A method, as set forth in claim 16, wherein said step of grinding includes the further step of adding an oxide or salt of at least one metal selected from the group consisting of V, Nb, Ta, W and Bi to said ground mixture.

19. A method, as set forth in claim 11, wherein said antimony compound is selected from the group consisting of alpha-antimony oxide and antimony chloride.

20. A method, as set forth in claim 11, wherein said step of heating is conducted for a period ranging from at least about one-half to about 18 hours.

* * * * *